United States Patent
Ryan et al.

(10) Patent No.: US 8,166,030 B2
(45) Date of Patent: Apr. 24, 2012

(54) INFORMATION RESOURCE TAXONOMY

(75) Inventors: Simon David Ryan, Glen Waverley (AU); Bhavani Raskutti, Surrey Hills (AU); Do Quang Phiet, Mulgrave (AU); Peter Paul Sember, Carnegie (AU)

(73) Assignee: Telstra Corporation Limited, Melbourne, Victoria (AU)

( * ) Notice: Subject to any disclaimer, the term of this patent is extended or adjusted under 35 U.S.C. 154(b) by 0 days.

(21) Appl. No.: 10/499,587

(22) PCT Filed: Dec. 18, 2002

(86) PCT No.: PCT/AU02/01719
§ 371 (c)(1),
(2), (4) Date: Dec. 6, 2004

(87) PCT Pub. No.: WO03/052627
PCT Pub. Date: Jun. 26, 2003

(65) Prior Publication Data
US 2005/0080781 A1      Apr. 14, 2005

(30) Foreign Application Priority Data
Dec. 18, 2001     (AU) ............................................ 9589

(51) Int. Cl.
*G06F 17/30*     (2006.01)

(52) U.S. Cl. ....................................... 707/736; 707/737

(58) Field of Classification Search ........... 707/101–102
See application file for complete search history.

(56) References Cited

U.S. PATENT DOCUMENTS

| | | | |
|---|---|---|---|
| 5,442,778 A | 8/1995 | Pedersen et al. | |
| 5,708,822 A | 1/1998 | Wical | |
| 5,768,580 A | 6/1998 | Wical | |
| 5,819,258 A * | 10/1998 | Vaithyanathan et al. | 707/2 |
| 5,963,965 A | 10/1999 | Vogel | |
| 5,974,412 A * | 10/1999 | Hazlehurst et al. | 707/3 |
| 6,094,653 A | 7/2000 | Li et al. | |
| 6,137,911 A | 10/2000 | Zhilyaev | |
| 6,178,396 B1 | 1/2001 | Ushioda | |

(Continued)

FOREIGN PATENT DOCUMENTS

EP         0704810 B1     4/1996

(Continued)

OTHER PUBLICATIONS

Jain, A.K., et al., *Data Clustering: A Review*, (Article based on chapter entitled Image Segmentation Using Clustering in Advances contained in Image Understanding: A Festschrift for Azriel Rosenfeld, 1996 IEEE Computer Society Press) Published by ACM Computing Surveys, pp. 1, 265-323 (Sep. 1999) vol. 31, No. 3.

(Continued)

*Primary Examiner* — Hung Q Pham
(74) *Attorney, Agent, or Firm* — Nixon Peabody LLP (57) ABSTRACT

An information resource taxonomy system, including a data collector for collecting information resources from a communications network; and a taxonomy generator for generating a taxonomy represented by a hierarchy of resource clusters, using cluster criteria generated from the collected resources. The system includes an editor for editing the criteria, and a renderer for generating linked document data for displaying the hierarchy. A parallel cluster search system is used to evaluate clusters in parallel. The system also includes a parallel classifier for classifying further collected resources.

40 Claims, 4 Drawing Sheets

U.S. PATENT DOCUMENTS

| | | | |
|---|---|---|---|
| 6,185,550 B1 | 2/2001 | Snow et al. | |
| 6,199,034 B1 | 3/2001 | Wical | |
| 6,233,575 B1 * | 5/2001 | Agrawal et al. | 1/1 |
| 6,360,227 B1 * | 3/2002 | Aggarwal et al. | 707/102 |
| 6,446,061 B1 * | 9/2002 | Doerre et al. | 707/3 |
| 6,460,036 B1 * | 10/2002 | Herz | 707/10 |
| 6,711,585 B1 * | 3/2004 | Copperman et al. | 707/104.1 |
| 7,376,620 B2 * | 5/2008 | Kay et al. | 705/40 |

FOREIGN PATENT DOCUMENTS

| | | |
|---|---|---|
| WO | WO 00/62155 A1 | 10/2000 |
| WO | WO 00/62203 A1 | 10/2000 |
| WO | WO 01/62139 A1 | 8/2001 |
| WO | WO 01/77855 A1 | 10/2001 |
| WO | WO 02/25479 A1 | 3/2002 |

OTHER PUBLICATIONS

Baeza-Yates et al., "Modeling", *Modern Information Retrieval*, 1999, Chapter 2, pp. 17-71, Addison-Wesley, Harlow, GB.

Raskutti et al., "An Evaluation of Criteria for Measuring the Quality of Clusters," *Proceedings of the Sixteenth International Joint Conference on Artificial Intelligence*, 1999, pp. 905-910.

Ngo et al. "On Clustering and Retrieval of Video Shots." IEEE Transactions on Multimedia. vol. 4, No. 4, Dec. 1, 2002 (10 pages).

Result of Consultation mailed Jan. 24, 2012 issued in corresponding European Patent Application No. 02782539.7 (3 pages).

* cited by examiner

Figure 4

INFORMATION RESOURCE TAXONOMY

FIELD OF THE INVENTION

The present invention relates to taxonomies for information resources, and in particular to a system and process for generating a taxonomy for a plurality of information resources in a communications network.

BACKGROUND

The enormous number of stored electronic documents and other information resources available in modern communications networks such as the Internet poses particular problems for classification and categorisation. For example, the world wide web provides access to an ever-increasing number of electronic documents, many of them generated dynamically, and it is often difficult to retrieve a document of interest without knowing in advance at least part of an identifier, address or locator for the resource. For this reason, search engines have been developed which attempt to generate lists of relevant documents in response to keywords typed in by a user. However, such searches are limited by the choice of keywords entered by the user. As an alternative, directories of web resources have been created by manual vetting and categorisation of web documents into hierarchical category structures known as web directories. These directories are extremely useful for locating relevant documents once a particular category has been chosen. However, the development of these directories is a challenge in itself. For example, companies such as Yahoo! have employed more than 300 people for maintaining the structure of their online directory. This level of expenditure is not justifiable for most companies. More recently, some solutions have appeared which replace the manual vetting with automatic classification based on a manually created taxonomy. Although this alleviates the problem to some extent, the manpower needed to create and maintain the appropriate taxonomy is still considerable. It is desired, therefore, to provide an improved system and process for generating a taxonomy for information resources in a communications network, or at least a useful alternative.

SUMMARY OF THE INVENTION

In accordance with the present invention there is provided a process for generating a taxonomy for a plurality of information resources in a communications network, including:
  collecting said resources from said network;
  generating cluster criteria from said resources; and
  generating said taxonomy as a hierarchy of resource clusters based on said criteria, wherein the number of said resource clusters is determined by content of said resources.

The present invention also provides an information resource taxonomy system, including
  a data collector for collecting information resources from a communications network; and
  a taxonomy generator for generating a taxonomy represented by a hierarchy of resource clusters, using cluster criteria generated from said resources, wherein the number of said resource clusters is determined by content of said resources.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENT

Figure 1:
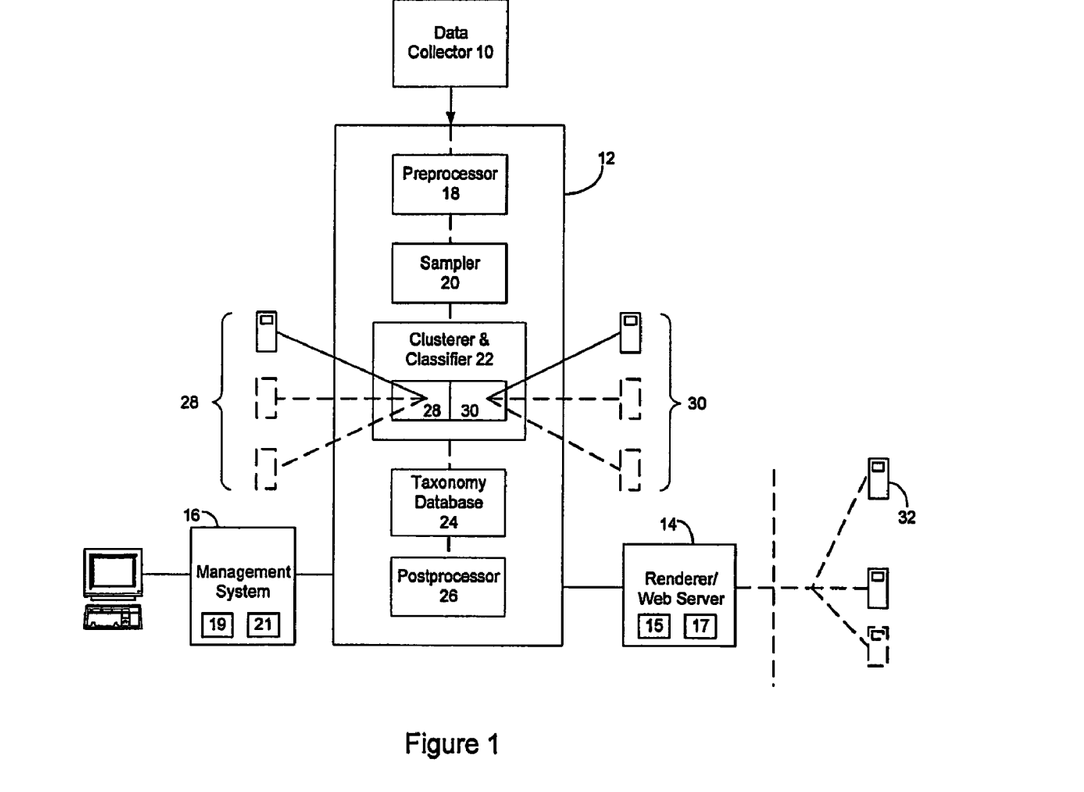
FIG. 1 is a schematic diagram of a preferred embodiment of an information resource taxonomy system.

As shown in FIG. 1, an information resource taxonomy system includes a data collector 10, a data processing system 12, a renderer 14, and a management system 16. The taxonomy system executes a taxonomy generation process that automatically generates a taxonomy from structured or unstructured documents or other information resources, and can be used to maintain the taxonomy. The taxonomy is a hierarchical tree structure that organizes resources into clusters or nodes based on their similarity, and can include the resources themselves. The taxonomy is subsequently used by the renderer 14 to generate markup code such as HTML, XML, or ASP that provides an interactive, hierarchical view into the space of documents or other information resources. A user of the Internet can view the hierarchy and open individual documents or other information resources over the Internet using a web browser 32 to access the markup code generated by the renderer 14 and generate a graphical display of the hierarchy. The taxonomy system can be applied to a variety of taxonomy generation tasks such as site management of corporate intranets and external web sites.

An administrator of the taxonomy system can login to the system from a terminal associated with the management system 16. The administrator can then submit to the taxonomy system a text file that defines the taxonomy specifications, i.e., the taxonomy creation tasks to be performed by the system. This file includes a list of universal resource indicators (URIs) and a corresponding list of 'include' specifications. The URIs indicate high-level domains that are to be clustered or categorised by the taxonomy system, and the 'include' specifications indicate the types of documents that are to be included in the taxonomy. For example, it may be desired to include only textual documents in one or more of the following formats: HTML, text, Microsoft Word®, FrameMaker, and StarOffice. The text file containing these specifications is sent to the data collector 10.

The components of the taxonomy system can be implemented using standard computer system hardware and adding unique software modules. For example, the data collector 10 and the renderer 4 are 850 MHz Pentium 3 and 1.5 GHz Pentium 4 personal computers, respectively, each running a Linux operating system. The data processing system 12 is a Sun Ultra Enterprise four-CPU server running a Solaris 8 operating system. The management system 16 is a 1.5 GHz Pentium 4 personal computer running a Windows XP operating system. The data processing system 12 includes a number of data processing modules 18 to 26, including a pre-processor 18, a sampler 20 a clusterer and classifier 22, a taxonomy database 24, and a post processor module 26. The data processing system 12 can further include parallel clusterers 28, and/or parallel classifiers 30. The renderer 14 includes a taxonomy rendering module 15 and a web server module 17. The management system 16 includes a process management component 19 and an editor module 21. Whilst these modules are preferably implemented by software code, at least some of the processing steps executed by the modules, described below, may be implemented by hardware circuits such as application-specific integrated circuits (ASICs).

Figure 2:
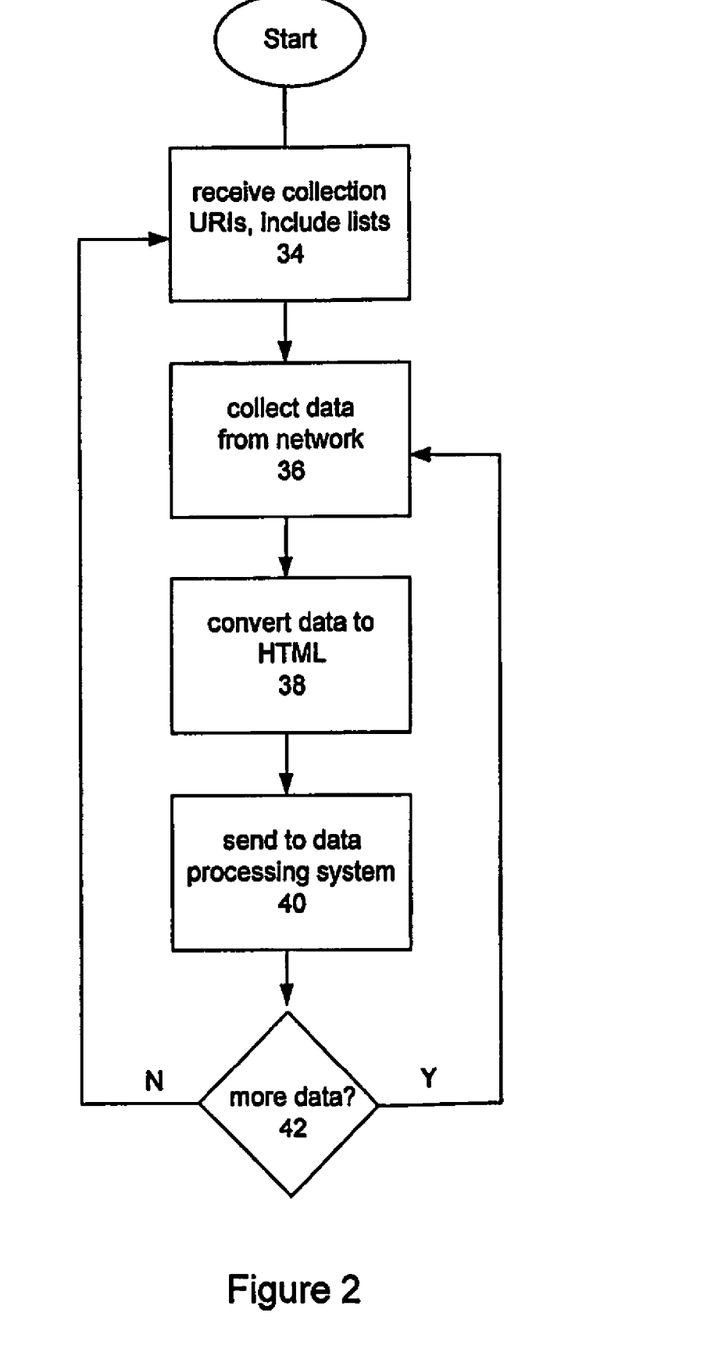
FIG. 2 is a flow diagram of a data collection process executed by a data collector of the system.

The data collector 10 executes a data collection process, as shown in FIG. 2. The data collection process begins at step 34 when the taxonomy specifications are received. The collector 10 uses the specifications to navigate or "crawl" the Internet at step 36, starting at the top level domains provided by the URI lists and progressing down to sub-domains thereof. The crawling process is known in the art. Briefly, the data collector 10 performs HTTP GET requests to network servers indicated by the provided URIs, or by links within HTML data previously retrieved from the network, including only those links that match the include specifications. For each document retrieved, the data collector 10 converts any documents that are not in HTML into HTML at step 38. The resulting HTML data is then sent to the data processing system 12 at step 40. If the data collector 10 has exhausted all of the hyperlinks contained within documents retrieved from the network, then the process branches at step 42 to return to step 34, and waits for the next category specification to be submitted by an administrator. Alternatively, if it is determined at step 42 that more data needs to be collected, the process branches back to step 36 in order to retrieve more data from the network.

Figure 3:
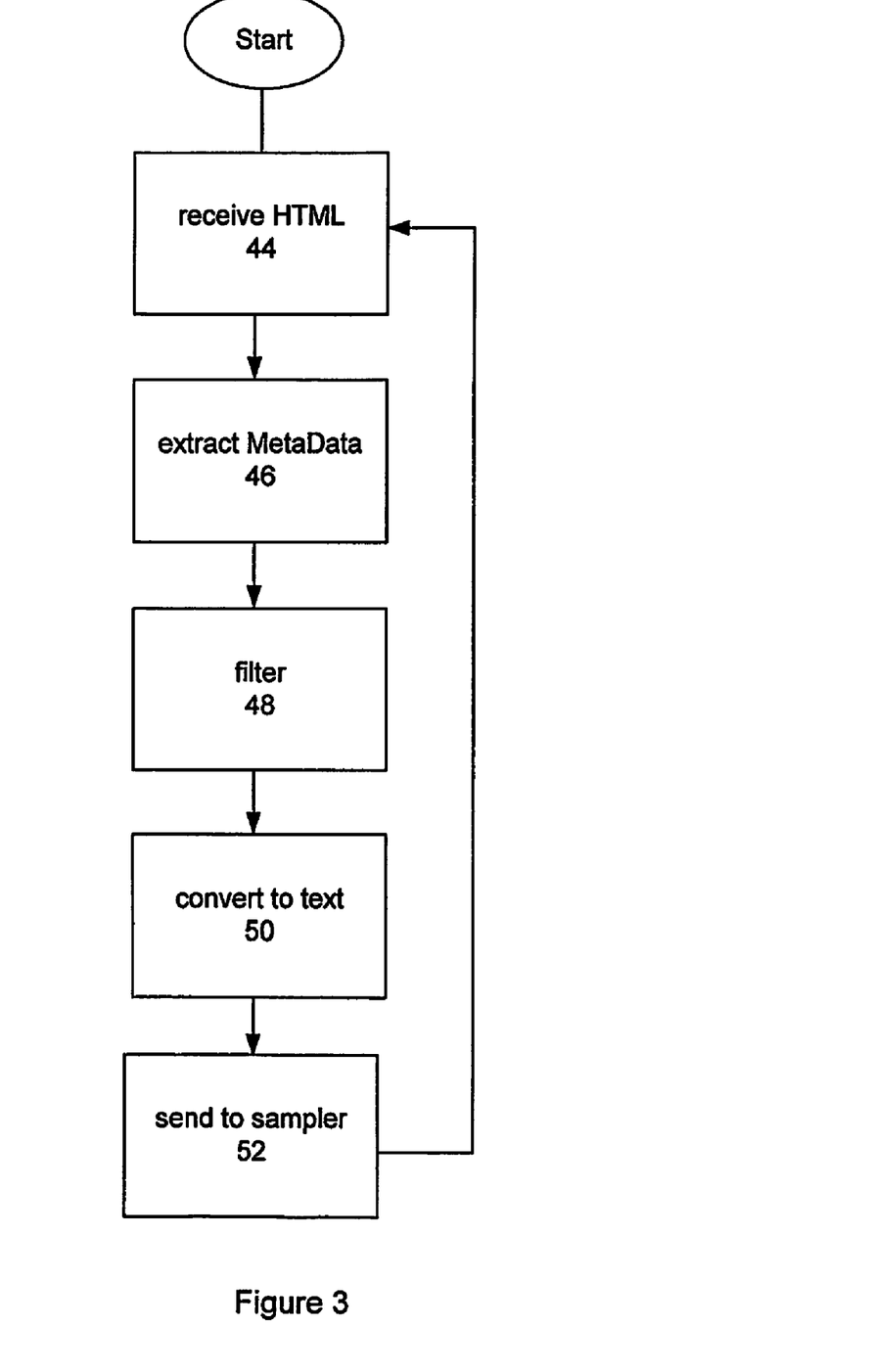
FIG. 3 is a flow diagram of a pre-processing process executed by a pre-processor of the system.

HTML data sent to the data processing system 12 from the data collector 10 is received by the pre-processor 18. Alternatively, HTML data can be directly submitted to the pre-processor 18 by the administrator using the management system 16. The pre-processor 18 executes an HTML processing process, as shown in FIG. 3. The process begins when HTML data is received by the pre-processor 18 at step 44. Metadata tags are then extracted from the HTML data at step 46. This is achieved by regular expression matching on pre-defined patterns such as the HTML tags <TITLE> <META . . . > and so on. Meta information is included in the output from the pre-processor 18 as text-delimited additions to the data. The delimiters are text markups that do not normally occur in the data, e.g., "xxxxxxxx:". The remaining data is then processed at step 48 by a filter that removes data that is not considered to be important. This includes removing text that appears likely to be a component of an advertising table or banner. Commonly occurring noise strings are removed by stoplists or by statistical analysis. For example, noise reduction can be achieved by building a frequency table of strings found in the document set. These strings are the characters found between matching pairs of HTML tags, such as <TD> and </TD>. A string is removed from the document set if its occurrence frequency exceeds a threshold value. At step 50, the pre-processor 18 converts the remaining HTML to text by removing HTML tags. The resulting text document is then sent to the sampler 20 at step 52. The sampler 20 samples a fixed fraction of incoming documents, as described below. The sample documents are then processed by the clusterer/classifier 22.

The clusterer 22 partitions the documents based on their content. It does this by forming groups or clusters of documents based on their natural affinity rather than requiring a pre-specified number of categories. The clustering and feature selection processes are based upon processes described in the specification of International Patent Application No. PCT/AU01/01198 ("the TACT specification"), incorporated herein by reference. First, each document is represented by a word frequency vector including words from the document and their frequencies of occurrence, where some words are excluded using feature selection criteria. A numeric similarity measure is then determined as a function of any two word vectors to determine the similarity of any two documents. For example, a new cluster can be formed by two documents if their similarity falls within a threshold similarity value for clustering. Once formed, a cluster is characterized by a word frequency vector that is the average of the word frequency vectors of its constituent documents. This average word frequency vector is referred to as the cluster centroid. The similarity measure used is the cosine similarity function, described in the TACT specification. The clustering process uses this similarity measure to group similar documents into clusters by assigning each document to the most similar cluster. An optimal similarity threshold value for creating clusters from a given document set is determined by creating different groupings of the documents at different thresholds and then evaluating these to determine the best grouping, as described in An Evaluation of Criteria for Measuring the Quality of Clusters by B. Raskutti and C. Leckie, pp. 905-910, in Proceedings of the Sixteenth International Joint Conference on Artificial Intelligence, 1999. This evaluation is based on minimising a goodness value that is based on the similarity of documents within clusters, which tends to reduce the number of documents in each cluster, and the separation of cluster centroids from the global centroid, which encourages larger clusters. For example, a goodness value for a document set can be determined by simply summing these two values.

Hierarchical clustering is achieved by iterative clustering of larger, less coherent clusters. The coherence of a cluster is determined by the intra-cluster similarity value of the cluster. If the documents in a cluster are very similar, i.e., the similarity values of each document with the cluster centroid fall within a similarity threshold for coherence, then the cluster is deemed coherent. If this criterion is not met, then documents within the cluster are formed into sub-clusters of the original cluster. These sub-clusters are sub-nodes of the original parent cluster or node, thus forming a hierarchy of clusters or nodes. By performing this sub-clustering iteratively, a hierarchical tree structure of coherent clusters is formed, to provide the taxonomy. The computational complexity of this clustering process is proportional to n, the number of documents, K, the number of threshold evaluations and m, the average number of clusters per threshold.

The clustering process includes several steps for alleviating some of the scalability issues by reducing n and K. Whilst m is much smaller that n, it is proportional to n, therefore reducing n also reduces m. In one form, execution time is reduced by using percentage-based random sampled clustering of the document space whereby the sampler 20 provides a fixed fraction of the document space to the clusterer 22 for clustering.

A second form is provided by stopping the clustering process after a predefined time interval in order to generate a clustered sample of the document space. These two forms of optimisation can be used independently or in conjunction.

After the initial clustering has been performed on a subset or sample of the document set, the remaining documents are subsequently assigned to the clusters by one of three processes. The first process simply classifies documents into the existing clusters using the existing cluster centroids. That is, a new document is added to an existing cluster if its similarity to the cluster centroid falls within a fixed threshold similarity value. Any documents failing the threshold evaluation criteria for all clusters are set aside for later clustering.

The second process uses the sample document clusters as a training set for an alternative document classification system. In this case, a support vector machine (SVM) is used as an alternative classifier. The SVM is described in the specification of International Patent Application No. PCT/AU01/

00415, incorporated herein by reference. As with the first process, any documents not classified are set aside for later clustering.

The third process simply continues to cluster, but using the optimal threshold similarity value determined whilst clustering the initial sample documents. This process forms new clusters for new documents that are not similar to the existing clusters.

Each of these three processes is an approximation and assumes that the original sample is representative of the complete (or future) document space. Consequently, errors are introduced over time as more documents are added to the clusters due to cluster centroid drift. Two processes are used to combat this effect In the first process, the coherence of the clusters is maintained as the number of documents n increases by reducing the similarity threshold with increasing n.

In the second process, a new random sample better representing the population is determined as the document collection grows. The new sample is used as a metric for evaluating the optimality of the existing clusters and/or as a means for determining a new quasi-optimal similarity threshold value for subsequent re-clustering of the document space to improve accuracy.

Figure 4:
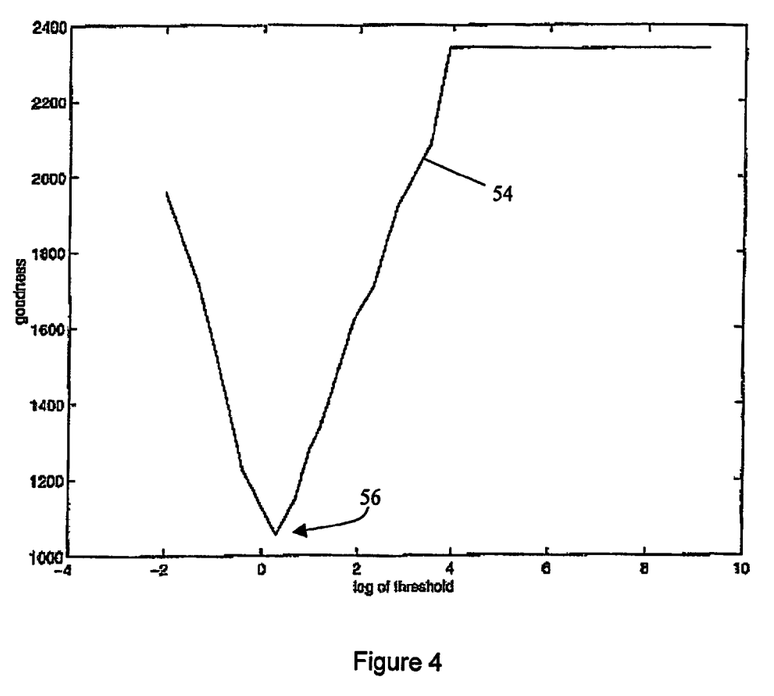
FIG. 4 is a graph of the goodness value of a document set as a function of the cluster threshold.

To reduce the time required by the search for an optimal or quasi-optimal similarity threshold value, cluster formation with different threshold values can be performed by different threads or on different processors in an SMP or distributed processing framework, such as the parallel clusterers 28. The time spent searching for the optimum threshold value is also reduced by using an efficient search process based on knowledge of the topography of the goodness vs threshold similarity curve. For example, FIG. 4 is a graph of the goodness value of a document set, as described above, as a function of the logarithm of the similarity threshold value for cluster formation. The solid line 54 joining data points has a well defined minimum 56 at a log (threshold) value near 0.2. The general shape of this graph is typical of all document sets. Knowing the approximate shape of this graph allows the optimal threshold value for a particular document set to be located rapidly.

The taxonomy produced by clustering is stored in the taxonomy database 24. After clustering, the postprocessor module 26 augments the clustered data by extracting titles from metadata of each document, and adding summary text generated by the clustering process, as described in the TACT specification. In cases where access logs (i.e., web server or proxy cache logs) are available for each document, the clusters and/or documents within each cluster can be ranked using the access frequency of each document. For example, on a corporate web server, the most popular pages are listed near the top of each category listing, and/or the most popular categories are listed near the top of a listing of categories.

The management system 16 includes an editor 21 that allows the administrator to manually edit a taxonomy to create a new document hierarchy. This new structure can then be used as the training set for adding further documents to the database using the classifier function of the clusterer/classifier 22. The speed of document classification by the categorisation system can be improved by using the parallel classifiers 30 to classify many documents in parallel.

The editor 21 offers a number of editing functions, including moving branches of the hierarchical taxonomy to other branches, editing meta descriptions for documents and branches, and creating, deleting, and merging new branches in the taxonomy. The editor 12 presents information from the taxonomy database 24 using HTML forms. Changes can then be made to the taxonomy by modifying input fields in the forms and then submitting the changes via submit buttons of the forms.

The taxonomy rendering module 15 of the renderer 14 generates dynamic web pages using the taxonomy database 24 to provide structure to the original resource content These web pages can be accessed by providing to the web browser 32 a URI associated with the web server module 17. The visual presentation provided by these web pages is derived from a configuration file detailing the arrangement of the various fields on the rendered page. The pages represent a web 'view' into the hierarchy using a 'directory' style wherein the URI of the displayed page corresponds to the position or branch within the taxonomy that is being browsed. Each level in the 'view' can contain documents and/or categories, i.e., deeper branches in the taxonomy. Browsing into a category produces a new view with a greater level of specificity. Each branch in the taxonomy is initially labelled automatically by extracting descriptive information from the data during taxonomy generation, as described above, and is manually editable by invoking the editor module 21 of the management system 16. Documents are presented using their titles and summaries. Browsing to the document opens the document or a representation of the document.

Many modifications will be apparent to those skilled in the art without departing from the scope of the present invention as herein described with reference to the accompanying drawings.

The invention claimed is:

1. A process for generating a taxonomy for a plurality of information resources in a communications network, including:
   (i) collecting said plurality of information resources from said communications network;
   (ii) generating clusters of said plurality of collected information resources on the basis of a similarity threshold value for clustering and similarity values for said plurality of collected information resources;
   (iii) iteratively generating sub-clusters of said generated clusters based on the similarity threshold value for clustering and similarity values for information resources within each of said generated clusters and within each of said generated sub-clusters, wherein the generated clusters and sub-clusters provide a hierarchy of resource clusters, wherein the number of resource clusters at each level of said hierarchy is determined by content of said plurality of collected information resources;
   (iv) collecting further information resources from said communications network;
   (v) assigning the further collected information resources to a plurality of the resource clusters;
   (vi) maintaining the coherence of the plurality of resource clusters as further collected information resources are assigned by at least one of:
      (a) reducing the similarity threshold value for clustering with an increasing number of the further collected information resources; and
      (b) selecting a random subset of resources from the collected information resources; generating a new similarity threshold value for clustering based on the selected random subset of resources; and re-clustering the collected information resources using the generated new similarity threshold value for clustering; and
   (vii) repeating the steps of collecting further information resources, reducing similarity and maintaining the coherence.

2. The process as claimed in claim 1, wherein said step of iteratively generating includes selecting one or more of said generated clusters if one or more intra-cluster similarity values for respective resources of said generated clusters exceeds corresponding similarity threshold value, and iteratively generating sub-clusters of the selected one or more of said generated clusters.

3. The process as claimed in claim 1, wherein said step of generating clusters includes:
selecting one or more portions of said plurality of information resources on the basis of respective metrics of the relevance of said one or more portions, wherein the number of said generated clusters is determined on the basis of the selected one or more portions of said plurality of information resources.

4. The process as claimed in claim 3, wherein clusters are generated on the basis of similarity values generated from word frequency data generated from one or more selected portions of said plurality of information resources.

5. The process as claimed in claim 1, including generating linked document data for displaying said hierarchy of resource clusters.

6. The process as claimed in claim 5, wherein said linked document data includes markup language data.

7. The process as claimed in claim 5, wherein said linked document data includes metadata of said plurality of information resources.

8. The process as claimed in claim 1, including generating descriptive text for said plurality of information resources and descriptive text for each resource cluster of said hierarchy.

9. The process as claimed in claim 1, wherein said plurality of information resources include dynamically generated content of said communications network.

10. The process as claimed in claim 1, wherein components of said hierarchy are sorted based on access frequencies of said plurality of collected information resources.

11. The process as claimed in claim 1, wherein a resource is added to an existing cluster if the similarity of said resource to said cluster meets a similarity requirement.

12. The process as claimed in claim 1, wherein a new cluster is generated if the similarity of resource to each existing cluster does not meet a similarity requirement.

13. The process as claimed in claim 1, wherein said step of generating clusters includes determining the similarity threshold value for clustering on the basis of goodness values for respective groupings of said plurality of collected information resources generated for respective similarity threshold values.

14. The process as claimed in claim 13, wherein the goodness value for each grouping is generated on the basis of similarity values for resources within the clusters of the grouping and differences between cluster centroids for the clusters of the grouping and a global centroid for said resources.

15. The process as claimed in claim 1, wherein said steps of generating clusters and iteratively generating sub-clusters are scalable with the number of said plurality of collected information resources.

16. The process as claimed in claim 1, wherein the plurality of information resources collected at step (i) are a selected subset of a larger set of resources including the further information resources collected at step (iv).

17. The process as claimed in claim 16, including selecting said subset by random sampling of said larger set of resources.

18. The process as claimed in claim 16, including classifying resources into said resource clusters.

19. The process as claimed in claim 16, including using said clusters generated at steps (ii) and (iii) as a training set for a classifier used at step (v) to assign the further information resources to at least one of the resource clusters.

20. The process as claimed in claim 19, wherein said classifier includes a support vector machine.

21. The process as claimed in claim 16, including clustering using a similarity value determined whilst clustering the subset of said larger set of resources.

22. The process as claimed in claim 21, including maintaining the coherence of clusters as the further additional resources are collected by reducing said similarity threshold value with increasing number of resources.

23. The process as claimed in claim 22, including determining a new similarity value for reclustering existing clusters on the basis of the quality of said existing clusters.

24. The process as claimed in claim 16, including maintaining generating a new hierarchy of resource clusters and classifying unselected resources into said new hierarchy of resource clusters.

25. The process as claimed in claim 16, including selecting a subset of clustered resources as the number of clustered resources increases to generate a metric for evaluating the quality of existing clusters.

26. The process as claimed in claim 1, including generating one or more new clusters for resources that are not substantially similar to existing clusters.

27. The process as claimed in claim 1, wherein said step of iteratively generating includes selecting one or more of said generated clusters on the basis of respective measures of coherence of said generated clusters, and iteratively generating sub-clusters of the selected one or more of said generated clusters.

28. An information resource taxonomy system having computer system hardware components, including at least one processor operating according to one or more software modules, the at least one processor and software modules configured to execute the steps of claim 1.

29. A computer-readable storage medium, having stored thereon program code for executing the steps of claim 1.

30. The process as claimed in claim 1, wherein the content of resources in each cluster determines the number of sub-clusters generated from the cluster in the immediately inferior level of the hierarchy.

31. The process as claimed in claim 30, wherein the number of levels of said hierarchy is determined by content of said plurality of information resources.

32. The process as claimed in claim 1 wherein the number of levels of said hierarchy is determined by content of said plurality of information resources.

33. An information resource taxonomy system, including:
a data collector having computer system hardware components including at least one processor operating according to one or more software modules, the at least one processor and one or more software modules configured for collecting information resources from a communications network;
a taxonomy generator for generating clusters of said collected information resources based on a similarity threshold value for clustering and similarity values for said collected information resources and for iteratively generating sub-clusters of said generated clusters based on the similarity threshold value for clustering and similarity values for information resources within each of said generated clusters and within each of said generated sub-clusters, wherein the generated clusters and sub-clusters provide a hierarchy of resource clusters, wherein the number of resource clusters in each level of said hierarchy is determined by content of said collected information resources;
a classifier configured to classify further information resources collected from the communication network to a plurality of the resource clusters; and
a component configured to maintain the coherence of the plurality of resource clusters as further information resources are classified by at least one of:
(a) reducing the similarity threshold value for clustering with increasing numbers of the further collected information resources; and
(b) selecting a random subset of information resources from the collected information resources;
generating a new similarity threshold value for the selected random subset of information resource; and
re-clustering the collected information resources using the new similarity threshold value for clustering.

34. The system as claimed in claim 33, including an editor for editing said taxonomy hierarchy of resource clusters, and a renderer for generating linked document data for displaying said hierarchy of resource clusters.

35. The system as claimed in claim 33, wherein said system is scalable with respect to the number of said information resources.

36. The system as claimed in claim 33, including a parallel cluster search system for evaluating clusters in parallel.

37. The system as claimed in claim 33, wherein the classifier is including a parallel classifier for classifying further resources in parallel.

38. The system as claimed in claim 33, wherein the number resource clusters in each level of said hierarchy is determined by content of resources, each resource cluster determines the number of sub-clusters generated from the resource cluster in the immediately inferior level of the hierarchy.

39. The system as claimed in claim 38, wherein the number of levels of said hierarchy is determined by content of said information resources.

40. The system as claimed in claim 33, wherein the number of levels of said hierarchy is determined by content of said information resources.

* * * * *